(12) United States Patent
Case et al.

(10) Patent No.: US 10,681,226 B2
(45) Date of Patent: Jun. 9, 2020

(54) SKIPPED-PITCH COMPENSATING PRINTING/FINISHING SYSTEM

(71) Applicant: Xerox Corporation, Norwalk, CT (US)

(72) Inventors: Hans F. Case, Jordan, MN (US); Kevin J. St. Martin, Rochester, NY (US); Douglas K. Herrmann, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/104,968

(22) Filed: Aug. 20, 2018

(65) Prior Publication Data
US 2020/0059564 A1 Feb. 20, 2020

(51) Int. Cl.
*H04N 1/00* (2006.01)

(52) U.S. Cl.
CPC ....... *H04N 1/0032* (2013.01); *H04N 1/00644* (2013.01); *H04N 1/00657* (2013.01)

(58) Field of Classification Search
USPC .................. 705/67, 7.21–7.27, 22, 300, 301; 710/6–18; 358/1.1–3.29
See application file for complete search history.

(56) References Cited

U.S. PATENT DOCUMENTS

| | | | |
|---|---|---|---|
| 4,843,959 A * | 7/1989 | Rendell | B41F 13/0032 101/93.01 |
| 5,095,369 A | 3/1992 | Ortiz et al. | |
| 5,159,395 A | 10/1992 | Farrell et al. | |
| 5,184,185 A | 2/1993 | Rasmussen et al. | |
| 5,287,497 A * | 2/1994 | Behera | G06Q 40/02 |
| 5,303,017 A | 4/1994 | Smith | |
| 5,337,135 A | 8/1994 | Malachowski et al. | |
| 5,422,705 A * | 6/1995 | Omelchenko | G03G 15/6538 399/405 |
| 5,495,339 A * | 2/1996 | Stegbauer | H04N 1/00954 358/296 |
| 5,710,635 A * | 1/1998 | Webster | G06F 3/1296 358/1.13 |
| 7,787,138 B2 | 8/2010 | Lofthus et al. | |
| 2006/0263110 A1* | 11/2006 | Sahay | G03G 15/50 399/82 |
| 2008/0304697 A1* | 12/2008 | Richards | G03G 15/6538 382/100 |

* cited by examiner

Primary Examiner — Marcellus J Augustin
(74) Attorney, Agent, or Firm — Gibb & Riley, LLC

(57) ABSTRACT

A print job received by a printing system has subsets of items. Multiple items are printed on each sheet. Finishing devices of the printing system are limited to processing a single subset of the items at a time, causing printing devices to wait skipped-pitch delays. An unadjusted number of machine-hours to complete the print job is determined based on continuous printing without interruption. A skipped-pitch delay is assigned to each of the subsets of items based on the number of sheets used to print each of the subsets of items. A revised number of machine-hours to complete the print job is calculated by adding the total skipped-pitch delay for the print job to the unadjusted number of machine-hours. The number of the printing devices and the finishing devices to use to complete the print job is determined based on the revised number of machine-hours.

20 Claims, 4 Drawing Sheets

SKIPPED-PITCH COMPENSATING PRINTING/FINISHING SYSTEM

BACKGROUND

Embodiments herein relate to systems and methods that compensate for skipped-pitch delays that occur when printing or feeding devices operate in conjunction with finishing devices.

It is common for production environments to utilize printing, feeding, and finishing equipment together to produce finished items. For example, items can be printed while the finishing devices are used to alter, gather, stack, move, etc., the printed items, which sometimes creates finished products such as signs, bound books, magazines, finished mailers, etc.

One issue within production environments that use printing and finishing equipment together is the synchronization of such printing and finishing equipment. Many times, the printer and finisher may operate at different rates, causing one to wait for the other. This is especially complicated with any type of variable print applications where different printed items can be different from one another, and where the different printed items may be processed differently by the finishing equipment. In variable information printing (VIP) or variable data printing (VDP) the print job includes static items (that are included in all versions of the printed item) that are supplemented with variable items (that change in different versions of the printed item). The productivity of variable print applications requiring finishing is impacted by skipped-pitches introduced to provide time for finishing movements. Further, down-stream finisher bottlenecks are created due to the variability in the variable job stream, resulting in printer skipped-pitches. In cases where a print job contains a varying number of subsets and varying skipped-pitches between subsets, estimating production forecasting can be unreliable.

Such challenges presented are enhanced because of the high speed of the equipment involved, which can prevent human intervention when user actions might be dangerous around fast-moving equipment, or user input may be too slow to keep the equipment operating at optimal rates.

SUMMARY

In view of such issues, various exemplary methods herein receive a print job into a printing system. The printing system has printing devices connected to finishing devices, and in some examples, each of the printing devices is connected to one of the finishing devices to form printing and finishing device pairs. The print job has subsets of items, and multiple ones of the items are printed on each sheet printed by the printing devices. Some of the subsets of items contain different numbers of items, differently printed items (duplex/simplex, different orientations, etc.), and different sized items (while the size of the sheets is generally uniform).

The finishing devices can be, for example, accumulating, indexing, and banding devices; and therefore, the finishing operations can include, for example, accumulating, indexing, and banding the items. However, the finishing devices are limited to processing a single subset of the items at a time. Thus, the printing devices wait skipped-pitch delays to output sheets of second subsets of items until finishing operations of first subsets of items are completed by the finishing devices (where the sheets of the "second" subsets of items are printed immediately following the sheets of the "first" subsets of items, without intervening sheets of subsets of items).

To address this, methods herein determine an "unadjusted" number of machine-hours to complete the print job by multiplying the total number of sheets of the print job by a printing rate of the printing devices based on continuous printing without interruption. Therefore, the unadjusted number of machine-hours to complete the print job does not include any skipped-pitch delays.

Also, these methods identify the number of sheets used to print each of the subsets of items. This allows such methods to assign one of the skipped-pitch delays to each of the subsets of items based on the number of sheets used to print each of the subsets of items. More specifically, the methods herein assign shorter skipped-pitch delays as the number of sheets used to print each of the subsets of items increases.

Then, these methods sum the skipped-pitch delays of all the subsets of items in the print job to produce a total skipped-pitch delay for the print job. This allows the methods herein to calculate a revised number of machine-hours to complete the print job by adding the total skipped-pitch delay for the print job to the unadjusted number of machine-hours.

Further, these methods determine the production number of the printing devices and the finishing devices to use to produce the print job by dividing the revised number of machine-hours to complete the print job by an hour-limit for having the print job completed. With this, the methods herein can produce the print job using the production number of printing devices and finishing devices to output the items by printing the sheets using the printing devices, supplying printed sheets to the finishing devices, and performing the finishing operations on the printed sheets using the finishing devices. In one alternative, the print job production can supply the printed sheets to sheet feeder devices and supply the printed sheets from the sheet feeder devices to the finishing devices, to cause the sheet feeder devices to wait the skipped-pitch delays instead of the printing devices waiting the skipped-pitch delays.

Various systems herein include (among other components) printing devices and finishing devices (e.g., accumulating, indexing, and banding devices) in communication with the processor. Each of the printing devices can be connected to only one of the finishing devices, to form printing and finishing device pairs.

The processor receives a print job that has subsets of items. Again, some of the subsets of items contain different numbers of items, differently printed items, and different sized items. The printing devices print multiple ones of such items on each sheet printed and the finishing devices are limited to processing a single subset of the items at a time (e.g., by accumulating, indexing, and banding the items). Therefore, the printing devices wait skipped-pitch delays to output sheets of second subsets of items until finishing operations of first subsets of items are completed by the finishing devices. Again, the sheets of the second subsets of items are printed immediately following the sheets of the first subset of items, without intervening sheets of subsets of items.

To account for the skipped-pitch delays, the processor determines an unadjusted number of machine-hours to complete the print job by multiplying the total number of sheets of the print job by a printing rate of the printing devices (based on continuous printing without interruption). The unadjusted number of machine-hours to complete the print job does not include any of the skipped-pitch delays.

The processor also identifies the number of sheets used to print each of the subsets of items. With this, the processor assigns one of the skipped-pitch delays to each of the subsets of items based on the number of sheets used to print each of the subsets of items by assigning shorter skipped-pitch delays as the number of sheets used to print each of the subsets of items increases.

The processor then sums the skipped-pitch delays of all the subsets of items in the print job to produce a total skipped-pitch delay for the print job. The processor calculates a revised number of machine-hours to complete the print job by adding the total skipped-pitch delay for the print job to the unadjusted number of machine-hours. The processor also determines how many (a production number) of the printing devices and the finishing devices to use to complete the print job by dividing the revised number of machine-hours to complete the print job by an hour-limit for having the print job completed.

The production number of the printing devices and the finishing devices then produce the print job to output the items by first using the printing devices to print the sheets. The printed sheets are supplied to the finishing devices and the finishing devices perform the finishing operations on the printed sheets. Such systems can alternatively include sheet feeder devices, where printed sheets are supplied from the printing devices to the sheet feeder devices, the sheet feeder devices supply the printed sheets to the finishing devices, and the sheet feeder devices wait the skipped-pitch delays instead of the printing devices waiting the skipped-pitch delays.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, the productivity of variable print applications requiring finishing is impacted by skipped-pitches introduced to provide time for finishing movements. One result is that down-stream finisher bottlenecks are created due to the variability in the job stream, resulting in printer skipped-pitches. In cases where a print job contains a varying number of subsets and varying skipped-pitches between subsets, estimating production forecasting can be unreliable.

In order to address such issues, the systems and methods herein provide an interrogation of a production print job to find subset boundaries, and thereby accurately calculate printer skipped-pitches that will be incurred during a production run. The calculated skipped-pitch count is then utilized to determine print demand, and the print demand is in turn utilized to accurately forecast the necessary hours of shop operation and staffing levels.

With methods and systems herein, the skipped-pitch requirement is dependent on the subset size (in one non-limiting example, a one sheet subset can require three skipped-pitches, a two sheet subset can require two skipped-pitches, etc.). Variable subset size job streams are typically unknown at the time of production, leading to highly variable production demand that is difficult to plan for. By applying the skipped-pitch calculator logic at pre-press time, the full production demand can be known, enabling appropriate hours of operation and levels of staffing to be set.

Figure 1:
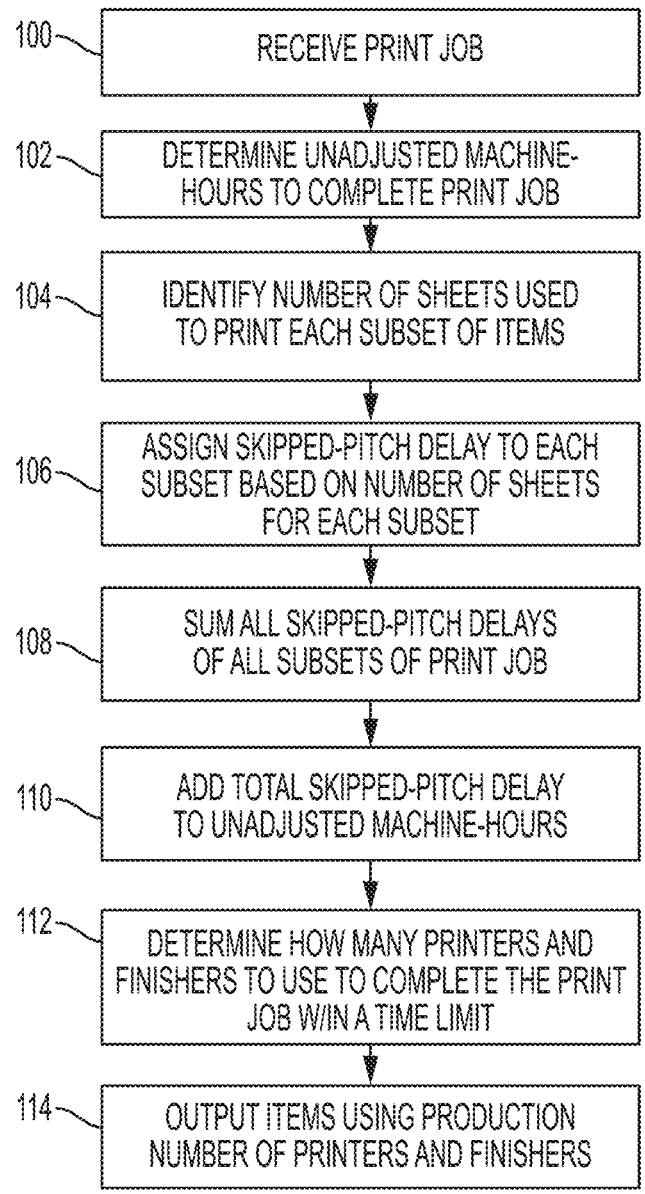
FIG. 1 is a flow diagram of various methods herein.

FIG. 1 is a flowchart illustrating exemplary methods herein. In item 100, these methods receive a print job into a printing system. The printing system has printing devices connected to finishing devices, and in some examples, each of the printing devices is connected to one of the finishing devices to form printing and finishing device pairs. The print job has subsets of items, and multiple ones of the items are printed on each sheet printed by the printing devices.

In some examples, the "items" are individual signs; and multiple signs are printed on, and cut from, each of the printed sheets before being stacked and moved from the stacking area by the finisher devices. In some examples, the signs are different from one another. Thus, some of the subsets of items contain different numbers of items, differently printed items (duplex/simplex, different orientations, etc.), and different sized items (while the size of the sheets is generally uniform).

While a uniform subset can include only identical items, in other examples each subset can be defined by other logical restrictions, such as logical classifications of the items. In other examples, different items can be grouped together into subsets of items that will be delivered to the same destination or geographic region, or items of the same size, type, printing quality, delivery date, use date, language, etc. In one specific example, the items may be marketing signs relating to a specific holiday season, and the subsets may be a specific mix of marketing signs that fit into a specifically sized box, such that each subset relates to a single box of holiday season marketing signs. Those skilled in the art would understand that the methods and systems herein can be used and applied to many different "items" and "subsets" and the foregoing are only examples and not limitations.

The finishing devices can be, for example, cutting, accumulating, indexing, banding, stacking, and/or moving devices, or any other type of finishing devices; and therefore, the finishing operations can include, on one example, cutting, accumulating, indexing, and banding the items. However, the finishing devices are limited to processing a single subset of the items at a time. Thus, the printing devices wait what is referred to herein as "skipped-pitch" delays to output sheets of second subsets of items until finishing operations of first subsets of items are completed by the finishing devices (where the sheets of the "second" subsets of items are printed immediately following the sheets of the "first" subsets of items, without intervening sheets of subsets of items).

To address this, in item 102, methods herein determine an "unadjusted" number of machine-hours to complete the print job by multiplying the total number of sheets of the print job by a printing rate of the printing devices based on continuous printing without interruption. Therefore, the unadjusted number of machine-hours to complete the print job found in item 102 does not include any skipped-pitch delays. In other words, the unadjusted number of machine-hours would be the fastest a print job could be produced, for example in the situation where a large batch of only the exact same items are produced, without waiting or interruption.

Also, in item 104, these methods identify the number of sheets used to print each of the subsets of items. This calculation looks to the size of items within a subset and to how many items of that subset can be printed on a single sheet to determine how many sheets each subset will use. For example, with variable information printing, the methods herein combine the variable data with the static print features in the print job to determine how many items are in each subset, how large (size) the items are, and how many can be printed on a given size sheet.

Additionally, printing requirements (quality, duplex/simplex, color/monochrome, etc.) may mandate that some items in a subset be printed on different sheets from other items in the same subset, which can increase the number of sheets used for that subset. As would be understood by those skilled in the art, other considerations can be included in item 104 to determine the number of sheets used to print each of the subsets of items.

The number of sheets used to print each of the subsets of items found in item 104 allows such methods to assign one of the skipped-pitch delays to each of the subsets of items, based on the number of sheets used to print each of the subsets, in item 106. Therefore, in item 106 different subsets of the print job can be assigned different skipped-pitch delays. More specifically, in item 106 the methods herein assign shorter skipped-pitch delays as the number of sheets used to print each of the subsets of items increases. As the number of sheets used to print each of the subsets increases, at some point the number of skipped-pitch delays will reach a minimum (remain constant at a minimum skipped-pitch delay).

While the relationship between the skipped-pitch delays and the number of sheets within a subset will change based on the operations performed by differently designed finisher devices, the following example can illustrate the concepts occurring in item 106. In the terminology used herein, the time that the printer takes to print a single sheet, or a sheet feeder takes to feed a sheet, is referred to as a single pitch.

In one non-limiting example, a finisher may execute three distinct finishing operations. Such exemplary finishing operations may include 1) accumulating the items cut from a sheet (one pitch); 2) indexing the items from a sheet (one pitch); and 3) banding the items from a sheet (two pitches). The 1) accumulating and 2) indexing can be performed simultaneously and, therefore, together they take a single pitch. Such three finishing operations take three pitches in total (one pitch for the accumulating and indexing, and two pitches for banding).

Therefore, a subset of a single sheet takes one pitch for printing, and three pitches for finishing, which causes the printer to skip three pitches as it waits for the finisher to perform the three-pitch finishing operation.

A subset of two sheets takes two pitches for printing, but again take three pitches for finishing, which causes the printer to skip two pitches. The second sheet can be printed simultaneously with one of the finishing pitches, reducing the number of pitches that the printer is idle.

A subset of three sheets takes three pitches for printing and three pitches for finishing. Herein, during two printing pitches, two finishing pitches can be performed; however, one pitch of the finisher is skipped while the finishing equipment waits for the first sheet of a subset to print, and vice versa. Subsets greater than three sheets still skip a minimum of one pitch because one pitch is always skipped while the finishing equipment waits for the first sheet of a subset to print, and vice versa.

As can be seen in the following table, in this simple example, any subset of three sheets or more will all have the same minimum number of skipped-pitches (e.g., 1), but subsets having less than three sheets will have progressively increasing numbers of skipped-pitches (e.g., 2, 3, etc.).

| Sheets | Skipped-pitches |
| --- | --- |
| 1 | 3 |
| 2 | 2 |
| 3 | 1 |
| 4 | 1 |
| 5 | 1 |

Again, this is only a non-limiting very simplified example, and the above operations are not the only finishing operations finisher devices of systems herein can perform, and the number of skipped-pitches can rise significantly higher than the number presented in this example. Also, the complexity of the calculation can increase as the number of operations that can be performed simultaneously increases, and the numbers of pitches that the different finishing operations take changes. As noted, the above is extremely simplified to present an easily understood example, while in reality the finishing operations can be very sophisticated and complex.

Further, while this example uses a printer directly feeding printed sheets to a finisher, the finishing operations can be performed offline. During such offline processing the printing occurs at one time and location and the printed sheets are finished at a different time and location. Sheet feeders supply the previously printed sheets to the finishers; however, the sheet feeders will experience the same skipped-pitches as the printers because the sheet feeders will wait for finishing operations of subsets of items to complete before feeding the next subset of items; and the finishing devices will wait for the sheet feeders to feed at least the first sheet. Therefore, the processing disclosed herein is equally applicable to printer/finisher pairs as it is to feeder/finisher pairs. While not mentioned repeatedly (for brevity and readability) the term "sheet feeders" can be substituted for "printers" in the other parts of the disclosure with equal effect.

Then, in item 108, these methods sum the skipped-pitch delays of all the subsets of items in the print job to produce a total skipped-pitch delay for the print job. This allows the methods herein to calculate a revised number of machine-hours to complete the print job in item 110 by adding the total skipped-pitch delay for the print job to the unadjusted number of machine-hours.

Further, as shown in item 112, these methods determine how many of the printing devices and the finishing devices to use to complete the print job within a given time limit (referred to herein as the "production number"). For example, the processing in item 112 can determine the production number by dividing the revised number of machine-hours to complete the print job by an hour-limit for having the print job completed.

With this, as shown in item 114, the methods herein can produce the print job using the production number of printing devices and finishing devices to output the items by printing the sheets using the printing devices, supplying printed sheets to the finishing devices and performing the finishing operations on the printed sheets using the finishing devices. In one alternative of the aforementioned offline processing in item 114, the print job production can supply the printed sheets to sheet feeder devices, and later supply the printed sheets from the sheet feeder devices to the finishing devices, to cause the sheet feeder devices to wait the skipped-pitch delays instead of the printing devices waiting the skipped-pitch delays.

The hardware described herein plays a significant part in permitting the foregoing method to be performed, rather than function solely as a mechanism for permitting a solution to be achieved more quickly, (i.e., through the utilization of a computer for performing calculations).

As would be understood by one ordinarily skilled in the art, the processes described herein cannot be performed by a human alone (or one operating with a pen and a pad of paper) and instead such processes can only be performed by a machine (especially when the volume of data being processed, and the speed at which such data needs to be evaluated is considered). For example, if one were to manually attempt to identify the subsets of items within print jobs that is automatically performed by the methods and devices discussed herein, the manual process would be sufficiently inaccurate and take an excessive amount of time so as to render the manual results useless, especially when the speed at which print jobs must be processed to achieve market-demanded economy is considered. Specifically, processes such as receiving a print job having subsets of items, wherein multiple items are printed on each sheet printed, identifying the number of sheets used to print each of the subsets of items, assigning one of the skipped-pitch delays to each of the subsets based on the number of sheets used to print each of the subsets of items, calculating a revised number of machine-hours to complete the print job, determining a production number of the printing devices and the finishing devices to use to complete the print job based on the revised number of machine-hours, and producing the print job, etc., requires the utilization of different specialized machines and is are integral to a specific, limited technological area, and humans performing such processing would not produce useful results because of the time lag, inconsistency, and inaccuracy humans would introduce into the results.

Further, the above printing and finishing processes include technological steps such as, electronic transmission of data over networks, creating bitmaps, altering bitmaps, controlling printheads using electronic data within bitmaps, etc., and require the utilization of different specialized machines. Therefore, for example, the data modification performed by the user device cannot be performed manually (because it would take decades or lifetimes) and is integral with the processes performed by methods herein. Specifically, processes such as processing data pixel-by-pixel, electronically storing bitmaps as 1's and 0's, etc., requires the utilization of different specialized machines, and humans performing such processing would not produce useful results because of the time lag, inconsistency, and inaccuracy humans would introduce into the results.

Additionally, the methods herein solve many highly complex technological problems. For example, as mentioned above, production environments suffer from technological problems of synchronization of printing and finishing equipment. As noted previously, many times the printer and finisher may operate at different rates, causing one to wait for the other. The productivity of variable print applications requiring finishing are also impacted by skipped-pitches introduced to provide time for finishing movements. Further, down-stream finisher bottlenecks are created due to the variability in the job stream, resulting in printer skipped-pitches. In cases where a print job contains a varying number of subsets and varying skipped-pitches between subsets, estimating production forecasting can be unreliable.

Such technological problems are especially complicated with any type of variable print applications where different printed items can be different from one another, and where the different printed items may be processed differently by the finishing equipment. With variable information printing, the variable data is combined with the static print features at the time of printing, masking how many sheets a given subset will use, and this makes manual or "pen and paper" calculations impossible (or little more than guesses). In contrast, the systems herein perform these methods by combining the variable data with the static print features to determine how many items are in each subset, how large the items are, and how many can be printed on a given sheet, which is not something that is achievable by humans alone.

Such technological challenges are enhanced because of the high speed of the equipment involved, which can prevent human intervention because user actions might be dangerous around fast-moving equipment, or user input may be too slow to keep the equipment operating at optimal rates. Methods and systems herein solve these technological problems to provide a technological improvement to the technology of print production systems by automatically identifying the number of sheets used to print each of the subsets of items, automatically assigning one of the skipped-pitch delays to each of the subsets based on the number of sheets used to print each of the subsets of items, automatically calculating a revised number of machine-hours to complete the print job, automatically determining a production number of the printing devices and the finishing devices to use to complete the print job based on the revised number of machine-hours, automatically producing the print job, etc. This reduces the amount of idle time for the devices, reducing the number of machines that need to be maintained, reducing the amount of resources consumed, etc., and thereby provides a substantial technological benefit and technological improvement to the technology of print production systems.

Figure 2:
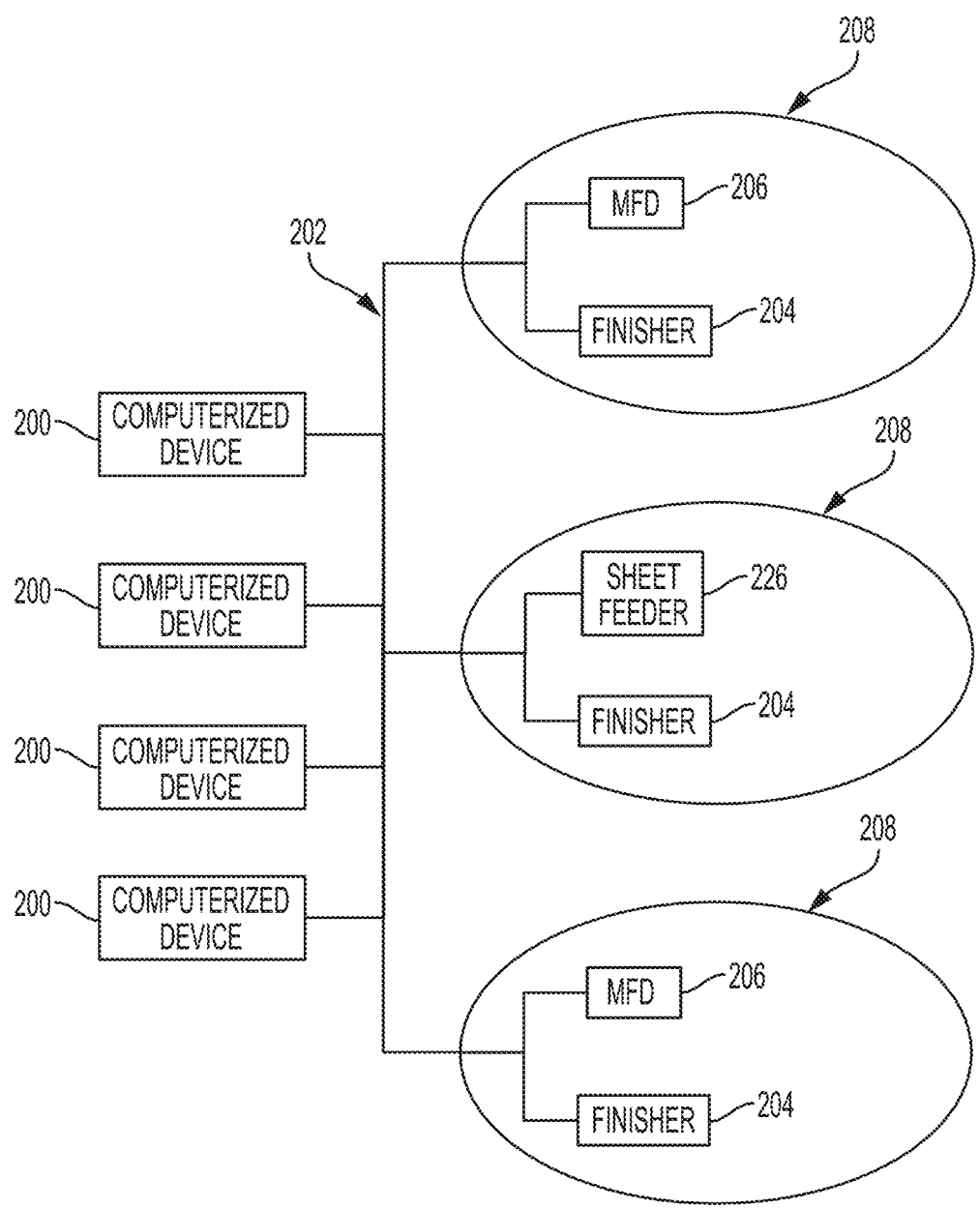
FIG. 2 is a schematic diagram illustrating systems herein.

As shown in FIG. 2, exemplary systems and methods herein include various computerized devices 200, 204, 206, 226 located at various different physical locations 208. The computerized devices 200, 204, 206, 226 can include print servers 200, finishing devices 204, printing devices (e.g., multi-function devices (MFD)) 206, offline sheet feeders 226, etc., and are in communication (operatively connected to one another) by way of a local or wide area (wired or wireless) network 202.

Figure 3:
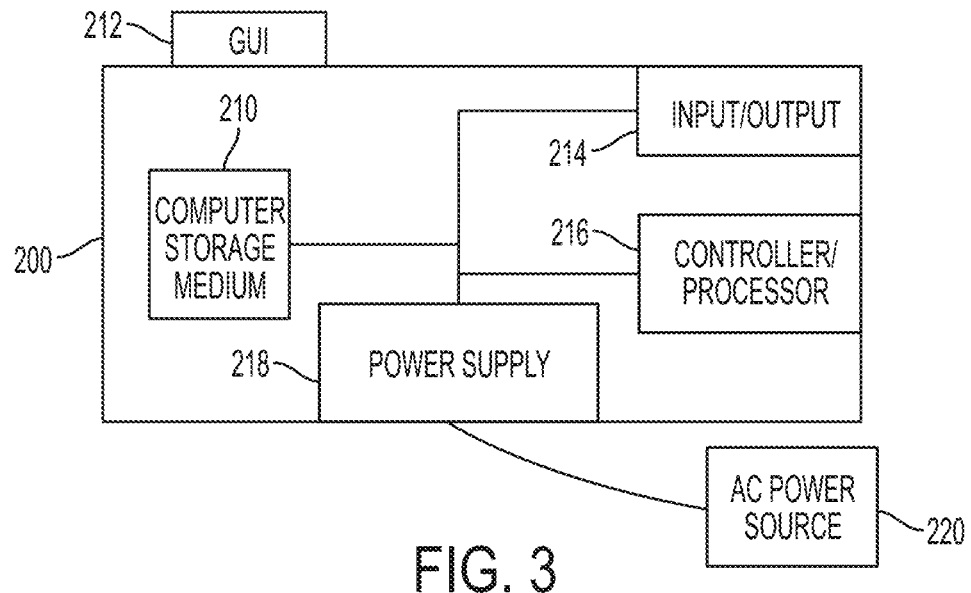
FIGS. 3 and 4 are schematic diagrams illustrating devices herein.

FIG. 3 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 3, a body housing has one or more functional components that operate on power supplied from an alternating current (AC) source 220 by the power supply 218. The power supply 218 can comprise a common power conversion unit, power storage element (e.g., a battery, etc.), etc.

Figure 4:
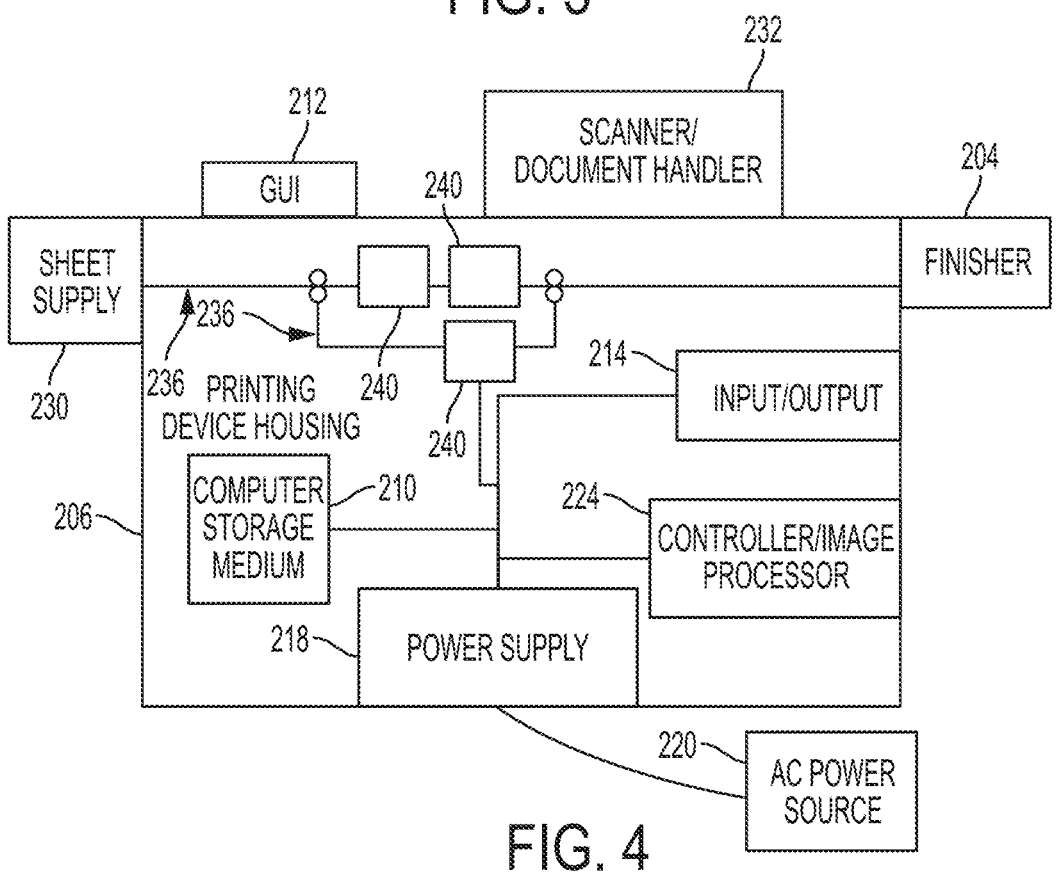

FIG. 4 illustrates a computerized device that is a printing device 206, which can be used with systems and methods herein and can comprise, for example, a printer, copier, multi-function machine, multi-function device (MFD), etc. The printing device 206 includes many of the components mentioned above and at least one marking device (printing engine(s)) 240 operatively connected to a specialized image processor 224 (that is different from a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media pass to a finisher 204 which can fold, staple, sort, cut, stack, move, accumulate, index, band, bind, etc., the various printed sheets. Also, the printing device 206 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

Figure 5:
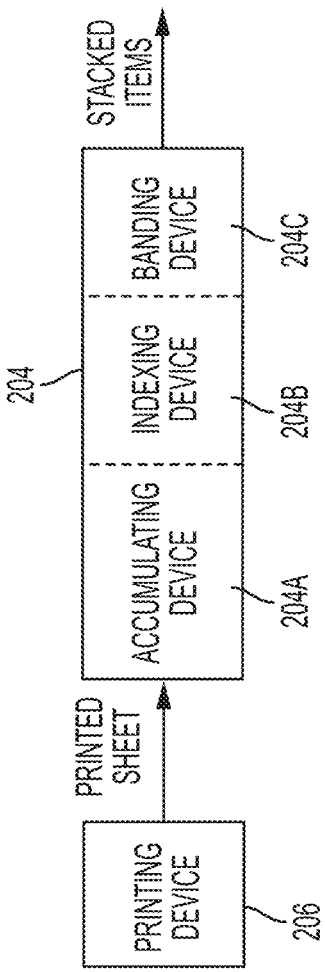
FIGS. 5 and 6 are schematic diagrams illustrating flows occurring with devices herein.

FIG. 5 illustrates the operations of the systems herein where a corresponding printer 206 outputs printed sheets to a corresponding finisher 204 where the two can be mechanically connected to each other, or connected by belts, sheet feeders, etc. The finisher 204 in this example executes three distinct finishing operations, including operation of an accumulating device 204A, an indexing device 204B, and a banding device 204C. In some examples, devices 204A-204D are separate, distinct devices, while in other examples a single device may perform multiple operations. Therefore, in one very specific example, the finishing operations may include accumulating the items with the accumulating device 204A, indexing the items with the indexing device 204B, and banding the items with the banding device 204C.

Figure 6:
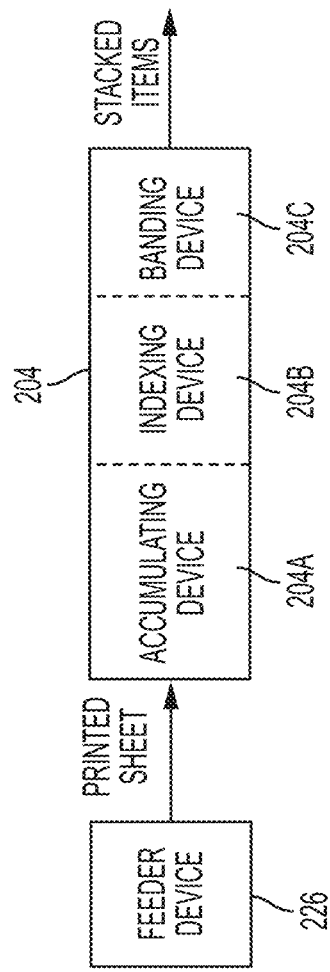

Further, as noted above online processing can be used, and FIG. 6 shows some elements used for offline finishing processing where sheets printed by the printing devices 206 are later supplied to a sheet feeder 226 at a different location (208, FIG. 2), and the sheet feeder 226 supplies the previously printed sheets to the finishing device 204. Again, in such an alternative the sheet feeder devices 226 wait the skipped-pitch delays instead of the printing devices 206 waiting the skipped-pitch delays because the sheet feeders 226 will wait for finishing operations of subsets of items to complete before feeding the next subset of items; and the finishing devices 204 will wait for the sheet feeders 226 to feed at least the first sheet.

Therefore, various systems herein include (among other components) printing devices 206, finishing devices 204 (e.g., accumulating, indexing, banding, etc. devices), and feeding devices 226, in communication with the processor 216, 224. Each of the printing devices 206 can be connected to only one of the finishing devices 204, to form printing and finishing device pairs, or each of the feeding devices 226 can be connected to only one of the finishing devices 204, to form feeding and finishing device pairs.

One or more of the aforementioned processors 216, 224 receives a print job that has subsets of items. Again, some of the subsets of items contain different numbers of items, differently printed items, and different sized items. The printing devices 206 print multiple ones of such items on each sheet printed and the finishing devices 204 are limited to processing a single subset of the items at a time (e.g., by accumulating, indexing, and banding the items). Therefore, the printing devices 206 wait skipped-pitch delays to output sheets of second subsets of items until finishing operations of first subsets of items are completed by the finishing devices 204. Again, the sheets of the second subsets of items are printed immediately following the sheets of the first subset of items, without intervening sheets of subsets of items.

To account for the skipped-pitch delays, the processor 216, 224 determines an unadjusted number of machine-hours to complete the print job by multiplying the total number of sheets of the print job by a printing rate of the printing devices 206 (based on continuous printing without interruption). The unadjusted number of machine-hours to complete the print job does not include any of the skipped-pitch delays.

The processor 216, 224 also identifies the number of sheets used to print each of the subsets of items. With this, the processor 216, 224 assigns one of the skipped-pitch delays to each of the subsets of items based on the number of sheets used to print each of the subsets of items by assigning shorter skipped-pitch delays as the number of sheets used to print each of the subsets of items increases.

The processor 216, 224 then sums the skipped-pitch delays of all the subsets of items in the print job to produce a total skipped-pitch delay for the print job. The processor 216, 224 calculates a revised number of machine-hours to complete the print job by adding the total skipped-pitch delay for the print job to the unadjusted number of machine-hours. The processor 216, 224 also determines how many (a production number) of the printing devices 206 and the finishing devices 204 to use to complete the print job by dividing the revised number of machine-hours to complete the print job by an hour-limit for having the print job completed. The production number of the printing devices 206 and the finishing devices 204 then produce the print job to output the items by first using the printing devices 206 to print the sheets. The printed sheets are supplied to the finishing devices 204 and the finishing devices 204 perform the finishing operations on the printed sheets. Such systems can alternatively include sheet feeder devices 226, where printed sheets are supplied from the printing devices 206 to the sheet feeder devices 226, the sheet feeder devices 226 supply the printed sheets to the finishing devices 204, and the sheet feeder devices 226 wait the skipped-pitch delays instead of the printing devices 206 waiting the skipped-pitch delays.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
    receiving a print job into a printing system having printing devices and finishing devices, wherein the print job has subsets of items, wherein multiple ones of the items are printed on each sheet printed by the printing devices, wherein the finishing devices are limited to processing a single subset of the items at a time, and wherein the printing devices wait skipped-pitch delays until finishing operations are completed by the finishing devices;
    determining an unadjusted number of machine-hours to complete the print job based on continuous printing without interruption;
    assigning one of the skipped-pitch delays to each of the subsets of items by assigning shorter skipped-pitch delays as a number of sheets used to print each of the subsets of items increases;
    calculating a revised number of machine-hours to complete the print job by adding the skipped-pitch delays of each of the subsets of items to the unadjusted number of machine-hours; and
    determining how many of the printing devices and the finishing devices to use to complete the print job based on the revised number of machine-hours.

2. The method according to claim 1, wherein the unadjusted number of machine-hours to complete the print job does not include any of the skipped-pitch delays.

3. The method according to claim 1, wherein some of the subsets of items contain different numbers of items, differently printed items, and different sized items.

4. The method according to claim 1, wherein printed sheets are supplied from the printing devices to sheet feeder devices, the sheet feeder devices supply the printed sheets to the finishing devices, and the sheet feeder devices wait the skipped-pitch delays.

5. The method according to claim 1, wherein the finishing operations comprise accumulating, indexing, and banding the items.

6. The method according to claim 1, wherein the printing devices wait the skipped-pitch delays to output sheets of second subsets of items until finishing operations of first subsets of items are completed by the finishing devices, and wherein the sheets of the second subsets of items are printed immediately following the sheets of the first subset of items, without intervening sheets of subsets of items.

7. The method according to claim 1, wherein each one of the printing devices is connected to one of the finishing devices to form printing and finishing device pairs.

8. A method comprising:
    receiving a print job into a printing system having printing devices connected to finishing devices, wherein the print job has subsets of items, wherein multiple ones of the items are printed on each sheet printed by the printing devices, wherein the finishing devices are limited to processing a single subset of the items at a time, and wherein the printing devices wait skipped-pitch delays to output sheets of second subsets of items until finishing operations of first subsets of items are completed by the finishing devices;
    determining an unadjusted number of machine-hours to complete the print job by multiplying a total number of sheets of the print job by a printing rate of the printing devices based on continuous printing without interruption;
    identifying a number of sheets used to print each of the subsets of items;
    assigning one of the skipped-pitch delays to each of the subsets of items based on the number of sheets used to print each of the subsets of items by assigning shorter skipped-pitch delays as the number of sheets used to print each of the subsets of items increases;
    summing the skipped-pitch delays of all the subsets of items in the print job to produce a total skipped-pitch delay for the print job;
    calculating a revised number of machine-hours to complete the print job by adding the total skipped-pitch delay for the print job to the unadjusted number of machine-hours;
    determining a production number of the printing devices and the finishing devices to use to complete the print job by dividing the revised number of machine-hours to complete the print job by an hour-limit for having the print job completed; and producing the print job using the production number of the printing devices and the finishing devices to output the items by:
  printing the sheets using the printing devices;
  supplying printed sheets to the finishing devices; and
  performing the finishing operations on the printed sheets using the finishing devices.

9. The method according to claim 8, wherein the unadjusted number of machine-hours to complete the print job does not include any of the skipped-pitch delays.

10. The method according to claim 8, wherein some of the subsets of items contain different numbers of items, differently printed items, and different sized items.

11. The method according to claim 8, wherein the producing further comprises supplying the printed sheets to sheet feeder devices and supplying the printed sheets from the sheet feeder devices to the finishing devices, wherein the sheet feeder devices wait the skipped-pitch delays.

12. The method according to claim 8, wherein the finishing operations comprise accumulating, indexing, and banding the items.

13. The method according to claim 8, wherein the sheets of the second subsets of items are printed immediately following the sheets of the first subset of items, without intervening sheets of subsets of items.

14. The method according to claim 8, wherein each one of the printing devices is connected to one of the finishing devices to form printing and finishing device pairs.

15. A system comprising:
  a processor receiving a print job;
  printing devices in communication with the processor; and
  finishing devices connected to the printing devices and in communication with the processor,
  wherein the print job has subsets of items,
  wherein the printing devices print multiple ones of the items on each sheet printed,
  wherein the finishing devices are limited to processing a single subset of the items at a time,
  wherein the printing devices wait skipped-pitch delays to output sheets of second subsets of items until finishing operations of first subsets of items are completed by the finishing devices,
  wherein the processor determines an unadjusted number of machine-hours to complete the print job by multiplying the total number of sheets of the print job by a printing rate of the printing devices based on continuous printing without interruption,
  wherein the processor identifies a number of sheets used to print each of the subsets of items,
  wherein the processor assigns one of the skipped-pitch delays to each of the subsets of items based on the number of sheets used to print each of the subsets of items by assigning shorter skipped-pitch delays as the number of sheets used to print each of the subsets of items increases,
  wherein the processor sums the skipped-pitch delays of all the subsets of items in the print job to produce a total skipped-pitch delay for the print job,
  wherein the processor calculates a revised number of machine-hours to complete the print job by adding the total skipped-pitch delay for the print job to the unadjusted number of machine-hours,
  wherein the processor determines a production number of the printing devices and the finishing devices to use to complete the print job by dividing the revised number of machine-hours to complete the print job by an hour-limit for having the print job completed, and
  wherein the production number of the printing devices and the finishing devices produce the print job to output the items by:
    the printing devices printing the sheets, wherein printed sheets are supplied to the finishing devices; and
    the finishing devices performing the finishing operations on the printed sheets.

16. The system according to claim 15, wherein the unadjusted number of machine-hours to complete the print job does not include any of the skipped-pitch delays.

17. The system according to claim 15, wherein some of the subsets of items contain different numbers of items, differently printed items, and different sized items.

18. The system according to claim 15, wherein the finishing devices comprise accumulating, indexing, and banding devices.

19. The system according to claim 15, further comprising sheet feeder devices, wherein printed sheets are supplied from the printing devices to the sheet feeder devices, the sheet feeder devices supply the printed sheets to the finishing devices, and the sheet feeder devices wait the skipped-pitch delays.

20. The system according to claim 15, wherein the sheets of the second subsets of items are printed immediately following the sheets of the first subset of items, without intervening sheets of subsets of items.

* * * * *